April 23, 1957 F. C. FERNANDEZ 2,789,449
LAWN MOWER SHARPENER
Filed May 6, 1955 2 Sheets-Sheet 1
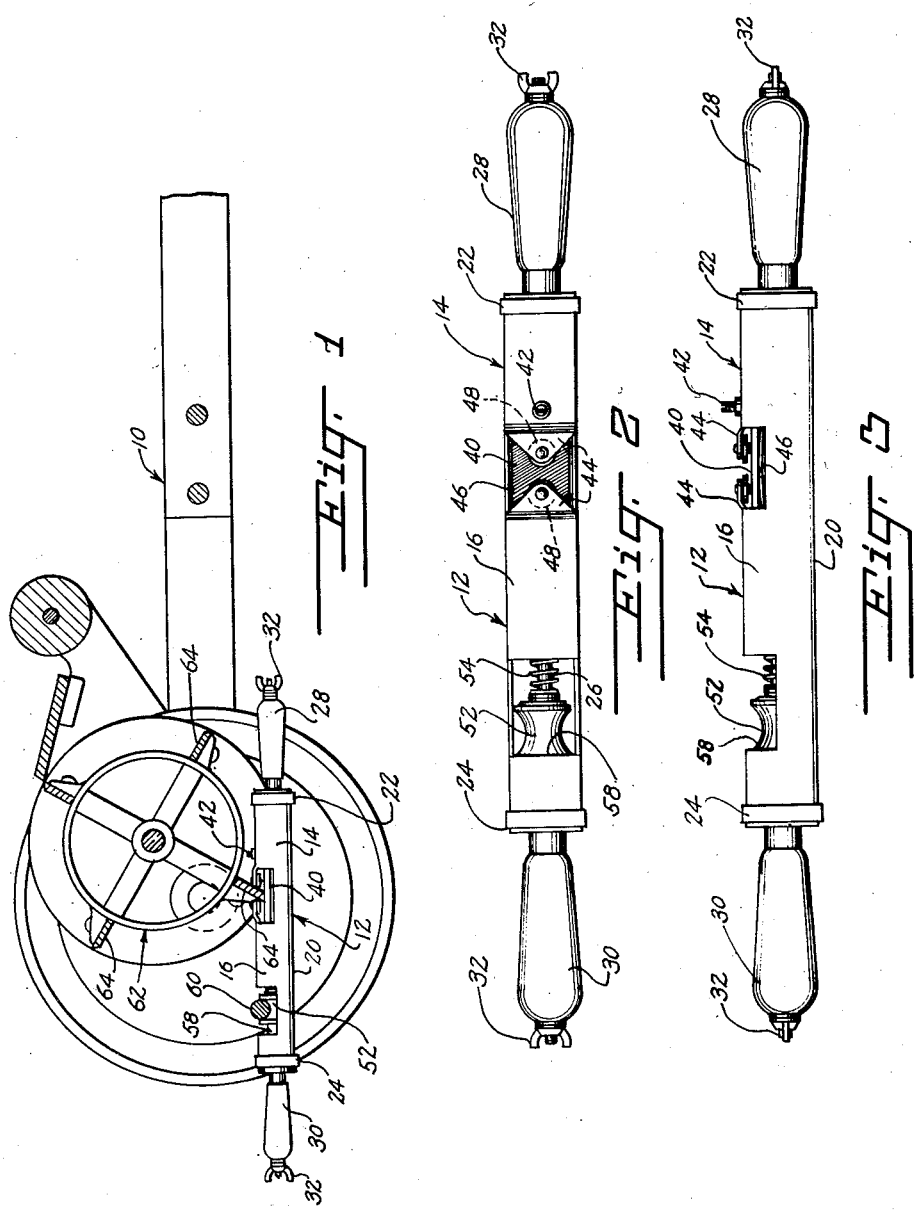
INVENTOR.
Frank C. Fernandez
BY
McMorrow, Berman & Davidson
Attorneys April 23, 1957 F. C. FERNANDEZ 2,789,449
LAWN MOWER SHARPENER
Filed May 6, 1955 2 Sheets-Sheet 2
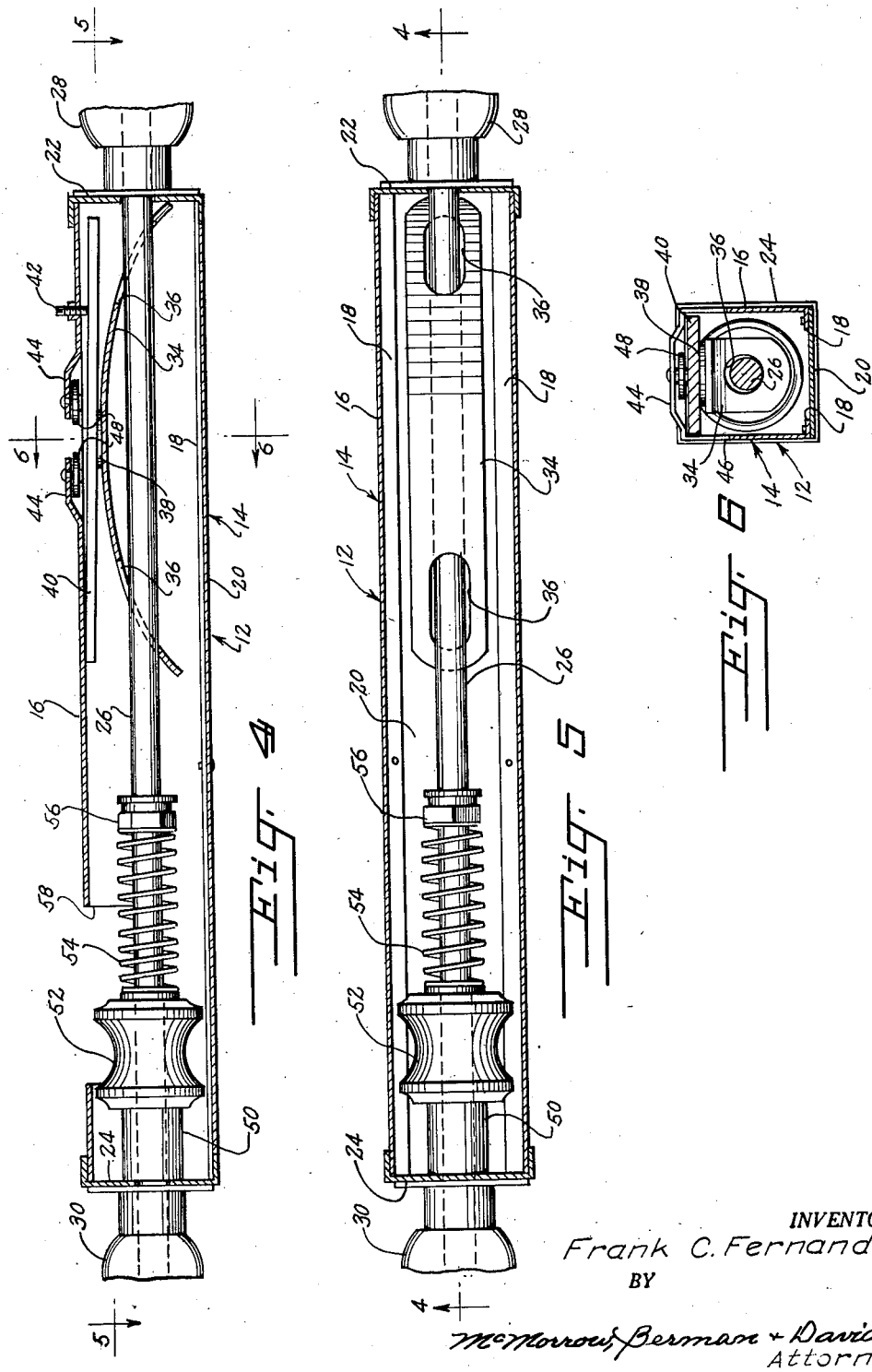
INVENTOR.
Frank C. Fernandez
BY
McMorrow, Berman + Davidson
Attorneys

United States Patent Office 2,789,449
Patented Apr. 23, 1957

2,789,449

LAWN MOWER SHARPENER

Frank Clarence Fernandez, Lawndale, Calif.

Application May 6, 1955, Serial No. 506,468

3 Claims. (Cl. 76—82.1)

This invention relates to lawn mower sharpeners, and more particularly has reference to a hand tool adapted to be applied to any hand lawn mower of the reel type.

By way of background, it may be observed that lawn mowers of the type referred to above can be sharpened in shops equipped for the purpose, on suitable machinery, but obviously, such machinery cannot be used by the ordinary householder except at a prohibitive expense. Heretofore, it has been proposed to provide hand operated sharpening devices for the cutting edges of the several blades of the reel of the mower, but certain disadvantages have been noted in the sharpening devices previously conceived. For example, in many instances the blade sharpening surface, usually provided upon a file or the like carried by the sharpener, is maintained too rigidly in respect to the blade against which it is pressed during the sharpening operation, and as a result, a uniform sharpening of said blade is not provided. In other instances, the file is not adjustable to maintain the filing surface thereof exactly in the plane of the blade edge to be sharpened, as the file traverses the reel from end to end thereof, and again, a lack of uniformity in respect to the the sharpening of the blades is the result.

In still other instances, the particular sharpening tool can be used with only one make or size of mower, and further, especially designed files, or files that are not replaceable, or adjustable to provide new filing surfaces, are required.

In view of the above, it is the main object of the present invention to provide a generally improved lawn mower sharpening device, so designed as to eliminate the several deficiencies discussed above, noted in sharpeners previously devised.

A more specific object of the invention is to provide a sharpening tool which will be so designed as to be capable of almost complete disassembly, with marked ease and speed, thus to permit replacement of any part.

A further object is to provide, in the sharpening tool, means adapted to roll along the cross bar of the reel frame, which means will be automatically adjustable longitudinally of the sharpening tool, toward and away from the filing surface thereof, so as to accommodate the tool to lawn mowers differing from one another in respect to the distance between the blade edge being sharpened and the cross bar of the mower.

Yet another object of importance is to provide a resilinet support for the file, which will press the file toward the cutting blade of the mower, providing a spring loading of the file, that will permit the file to yield as necessaary during the traverse of the cutting blade, to follow closely along the surface of the blade that is being sharpened.

A further object of importance is to provide a mounting for the file blade which will permit adjustment thereof to various angular relationships in respect to the longitudinal center line of the tool, thus to accommodate the file to the sharpening of lawn mower cutter blades the edges of which lie in planes correspondingly related angularly to the sharpening tool, when the tool is placed in engagement with the cross bar of the mower.

Other objects will appear from the following description, the claims appended thereto, and from the annexed drawing, in which like reference characters designate like parts throughout the several views, and wherein:

Figure 1 is a side elevational view of the tool as it appears when in use during the sharpening of a lawn mower, the lawn mower being shown in longitudinal section, portions of the mower being broken away;

Figure 2 is an enlarged top plan view of the sharpening tool;

Figure 3 is an enlarged side elevational view of the sharpening tool per se;

Figure 4 is a longitudinal sectional view, still further enlarged, taken on line 4—4 of Figure 5;

Figure 5 is a longitudinal sectional view, on the same scale as Figure 4, taken on line 5—5 of Figure 4; and Figure 6 is a transverse sectional view, on the same scale as Figures 4 and 5, taken on line 6—6 of Figure. 4.

The reference numeral 10 has been applied generally to a conventional hand lawn mower, and as shown in Figure 1 during the sharpening of the mower, the mower is inverted. Hereinafter, a more detailed description of the operation, including the steps required for preparing the mower for sharpening, will be provided.

The device constituting the present invention has been generally designated at 12, and includes an elongated casing generally designated 14, from sheet metal material or the like and having a rectangular cross section as shown in Figure 6.

The casing includes a body 16, forming the top wall and side walls of the casing, the side walls being formed, along the longitudinal edges thereof remote from the top wall, with inwardly turned flanges 18 (Figures 5 and 6) extending the full length of the casing. A bottom wall 20, formed as a flat, rectangular plate coextensive in width with the body 16, underlies the flanges 18, and is secured to the flanges by rivets or other fastening elements of an equivalent nature.

At opposite ends of the body, the casing includes caps 22, 24, peripherally flanged to engage over the ends of body 16 and bottom plate 20. The caps are readily removable from the body and bottom plate, to open the ends of the casing whenever the interior parts are to be removed for replacement or other purposes.

Extending longitudinally and centrally within the casing is a shaft 26 of cylindrical cross section, the ends of said shaft projecting through central openings formed in the caps, substantial distances beyond the opposite ends of the casing. The projecting ends of the shaft are extended through axial bores formed in handles 28, 30 and the extremities of the shaft project beyond the outer ends of the handles, and are threaded to receive wing nuts 32. It will be seen, thus, that by removal of the wing nuts, the handles 28, 30 can be removed from the shaft, and the shaft itself can be slipped out the casing. When the wing nuts are turned home against the ends of the handles, they force the handles 28, 30 inwardly toward one another axially of the shaft 26, so that the inner ends of the handles bear against the caps 22, 24 to hold the same in proper position upon the ends of the casing body.

Referring to Figures 4 and 5, within the casing, adjacent one end thereof, is an elongated leaf spring 34, having adjacent its opposite extremities longitudinally extending slots 36 loosely receiving the shaft 26. Secured to the upper surface of the leaf spring, medially between the opposite ends of the spring, that is, at the crest of the arch defined by the spring, is a flat, circular washer 38, bearing against the underside of a flat, elongated file 40. The file 40 is, per se, conventional, thus to facilitate replacement of the file whenever it becomes excessively worn.

The file 40, as shown in Figure 4, at one end bears against the underside of the top wall of the casing body 16, while the other end portion of the file is resiliently urged by the spring against the inner end of an adjusting screw 42 threadedly engaged in said casing body top wall. The set screw 42, when turned in a direction to shift the same inwardly of the casing, shifts the associated end portion of the file away from the top wall of the casing, so that the file is maintained with its length angularly related to the longitudinal center line of the casing, that is to the axis of the shaft 26. This position of the file, it has been found, is particularly adapted to locate the top, blade engaging surface thereof in the plane of the surface of the lawn mower blade that is to be sharpened.

Due to the provision of the set screw 42, the blade can be adjusted to any of various angular relationships relative to the shaft 26, and can, in fact, be further adjusted into full parallelism with the shaft 26, by threading the set screw 42 upwardly in Figure 4 to an extent sufficient to retract the inner end thereof into the plane of the casing top wall.

Immediately above the intermediate portion of the file 40, the top wall of the casing body is provided with upwardly offset triangular portions 44 (Figures 2 and 4), projecting inwardly toward one another from the opposite ends of a large opening 46 formed in the casing body, through which the file surface is exposed. A pair of guide discs 48 are rotatably mounted on the apex portions of the upwardly offset projections 44, and are loosely rotatable upon said projections, so as to engage against opposite sides of the lawn mower blade that is being sharpened, for the purpose of properly locating the tool relative to the blade as the tool traverses the length of the blade.

A sleeve 50 is removably and rotatably positioned upon the shaft 26, and at one end abuts against the cap 24, the other end of the sleeve terminating at a roller 52 also freely rotatable upon the shaft 26. The sleeve 50 constitutes a spacer or limit stop, and can either be integral with the roller 52, or be formed as a piece separate and distinct from the roller, whichever is desired. The roller 52, at its other end, is engaged against one end of a compression coil spring 54, which is circumposed about shaft 26 and is abutted at its opposite end against a nut 56. The shaft can be threaded for adjusting the nut longitudinally of the shaft, thus to adjust the tension of the spring 54.

A large opening 58, formed in the top wall of the casing and extending downwardly along the side walls of the casing body, is provided, within which opening the roller 52 is exposed.

In use of the tool, the lawn mower 10 is inverted, and the operation is preferably formed upon a box or bench, with the mower fastened down so that it will not move during the sharpening operation. Then the conventional adjusting screws of the mower are loosened, so that the reel will turn freely in either direction.

Thereafter, the sharpener is positioned as shown in Figure 1, and the peripherally grooved roller 52 is disposed to receive the conventional cross bar 60 of the lawn mower. With the roller engaged with the cross bar, the sharpening device is positioned so that the particular lawn mower blade that is being sharpened is extended between the guide discs 48, into opening 46, in engagement with the sharpening surface of the file 40. During this step, the roller 52 may be shifted longitudinally of the casing, against the restraint of the spring 54, so as to accommodate the device to the particular mower. In other words, one mower may differ from another in respect to the distance between the blade 64 of the cutter reel 62 thereof, and the cross bar 60. The device, as will be seen, accommodates itself to the varying distances found in different types or makes of mowers.

Now, the sharpening operation may proceed, and the user grasps the handles 28, 30, and shifts the device longitudinally of the cutter reel, with the surface of the file in engagement with the edge surface of the blade 64. As the sharpening tool is moved from end to end of the reel, the reel will turn, due to the spiralling formation of the blades 64 thereof, but at all times, the file 40 is resiliently pressed into engagement with the edge of the blade 64, so as to sharpen said edge uniformly from end to end of the blade. The spring mounting of the file, as previously mentioned herein, permits the file to yield resiliently, and at all times causes the file to bear firmly against the blade edge that is to be sharpened.

In use of an actual, full size embodiment of the invention, it has been found that one need only reciprocate the tool, from end to end of the blade being sharpened, for approximately 15 to 30 strokes, to provide the complete sharpening of the blade. After each blade is sharpened, the reel is rotated to dispose another blade in engagement with the file, and it has been found that the entire sharpening operation of the lawn mower can be completed in a very short time, this depending, of course, on the condition of the mower blades.

Whenever a particular surface of the file becomes excessively worn, the file can be adjusted longitudinally of the casing with ease, by removing one of the handles and the adjacent cap 22. When this is done, one has access to the file, and can shift the file in the direction of its length so as to dispose a new surface in the space between the guide discs 48. Further, the file can be readily removed for replacement, can be turned over whenever desired to provide a new or different type of filing surface, and in addition, by selective positioning of the file through the use of the set screw 42, the file can be disposed at a selected angular relationship relative to the blade, so as to be maintained in full engagement with the blade edge. This is desirable, since the blades of some lawn mowers differ from others, in respect to the angularity of the plane of the blade's cutting edge in respect to the plane of the blade width. In every instance, the device is swiftly adjusted to the particular blade, so as to properly sharpen the same.

Further, the use of the longitudinally shiftable, spring loaded roller permits the device to be adjusted to different lawn mowers varying from one another in respect to the distance between the cross bar and the blade being sharpened, as previously noted herein, and the roller itself can be removed and interchanged if desired, to provide different rollers the cross sectional shapes of the grooves which vary, to accommodate the same to cross bars differing from one another in respect to their cross sectional shapes or areas.

It will be seen that the tool can be used with minimum difficulty, so that if desired, it can be reciprocated between the ends of the several blades for a few strokes, each time the mower is to be used, to maintain the blades in a sharpened condition at all times.

Further, the guide discs have a desirable characteristic, in that they reduce friction of the blade against the associated portion of the tool, as the tool is moved between the ends of the lawn mower blade, while still properly maintaining the blade in the desired position in respect to the filing surface.

If desired, the tool can be used in conjunction with an additional small hand file, the purpose of which may be to sharpen the stationary bottom bar of the mower.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to

What is claimed is:

1. A sharpener for a reel type lawn mower having cutting blades and a cross bar, comprising: an elongated casing including a body having openings spaced longitudinally thereof, said casing further including removable caps closing the body at its opposite ends; a shaft extending longitudinally of and within the casing and having its ends projecting through the caps beyond opposite ends of the casing; handles removably mounted on said ends of the shaft in engagement with the caps to facilitate reciprocation of the casing from end to end of a blade being sharpened, said handles when removed freeing the caps for removal from the ends of the casing to permit removal of the shaft from the casing; file means including a leaf spring carried by said shaft within said casing so that it is in a bowed tension condition with the crest portion adjacent one of said openings, a file supported upon the crest portion of said leaf spring and engaged against the casing body, said file being exposed through one of said openings for sharpening the edge of the selected blade; and guide means carried by the shaft within the casing and exposed through the other casing opening, said guide means being mounted on the shaft for movement longitudinally thereof toward and away from the file means and being adapted to engage against said cross bar to guide the casing therealong during reciprocation of the casing.

2. A sharpener for a reel type lawn mower having cutting blades and a cross bar, comprising: an elongated casing including a body having openings spaced longitudinally thereof and removable caps closing the body at opposite ends thereof; a shaft extending longitudinally of and within the casing and having its ends projecting through the caps beyond opposite ends of the casing; handles removably mounted on the projecting ends of the shaft in engagement with the caps, to facilitate reciprocation of the casing from end to end of a blade being sharpened, said handles when removed permitting removal of the caps and shaft from the casing; file means carried by the shaft within the casing, said file means including a leaf spring having openings adjacent opposite ends thereof loosely receiving the shaft, said leaf spring being maintained by the shaft in a bowed, tensioned condition with the crest portion of the leaf spring being disposed adjacent one of said openings, a file supported upon the crest portion of the leaf spring, one end of said file being engaged against the casing body, and an adjusting screw threaded in the casing body in engagement with the other end of the file, for adjusting the file to selective positions relative to the shaft, said file being exposed through said one opening for sharpening the edge of the selected blade during reciprocation of the casing between the ends of the blade; and guide means carried by the shaft within the casing and exposed through the other casing opening, said guide means being mounted on the shaft for movement longitudinally thereof toward and away from the file means and being adapted to engage against said cross bars to guide the casing therealong during reciprocation of the casing.

3. A sharpener for a real type lawn mower having cutting blades and a cross bar, comprising: an elongated casing including a body having openings spaced longitudinally thereof, said casing further including removable caps closing the body at its opposite ends; a shaft extending longitudinally of and within the casing and having its ends projecting through the caps beyond opposite ends of the casing; handles removably mounted on said ends of the shaft in engagement with the caps to facilitate reciprocation of the casing from end to end of a blade being sharpened, said handles when removed freeing the caps for removal from the ends of the casing to permit removal of the shaft from the casing; file means removably mounted on the shaft within the casing and exposed through one of said openings for sharpening the edge of the selected blade; and guide means carried by the shaft within the casing and exposed through the other casing opening, said guide means being mounted on the shaft for movement longitudinally thereof toward and away from the file means and being adapted to engage against said cross bar to guide the casing therealong during reciprocation of the casing, said guide means comprising a peripherally grooved roller freely rotatable upon the shaft and adapted to roll along said cross bar, an abutment upon the shaft engaging against the roller at one end thereof, a second abutment on the shaft spaced from the other end of the roller, and spring means held under compression between the second abutment and said other end of the roller, whereby to permit said roller to be shifted against the restraint of said spring means in a direction toward the file means, away from the first named abutment to locate the roller a selected distance from the file means.

References Cited in the file of this patent

UNITED STATES PATENTS

| | | |
|---|---|---|
| 1,962,537 | Thomas | June 12, 1934 |
| 2,140,437 | Walker | Dec. 13, 1938 |